United States Patent [19]

Becker

[11] 4,166,345
[45] Sep. 4, 1979

[54] LIGHT-TRANSMISSIVE, SOUND AND HEAT INSULATING BUILDING ELEMENT

[76] Inventor: Otto A. Becker, Robert Koch-Str. 59, Saarbruecken, Fed. Rep. of Germany

[21] Appl. No.: 754,948

[22] Filed: Dec. 28, 1976

[30] Foreign Application Priority Data

Dec. 31, 1975 [DE] Fed. Rep. of Germany ....... 2559342
Sep. 3, 1976 [DE] Fed. Rep. of Germany ....... 2639656

[51] Int. Cl.² .......................... E04C 2/36; E04B 1/74
[52] U.S. Cl. ...................................... 52/172; 52/304; 52/789
[58] Field of Search ................. 52/171, 172, 616, 173; 181/336

[56] References Cited

U.S. PATENT DOCUMENTS

| | | | |
|---|---|---|---|
| 3,803,784 | 4/1974 | Becker | 52/172 |
| 3,834,096 | 9/1974 | Becker | 52/172 |
| 3,935,683 | 2/1976 | Derner | 52/172 |
| 3,990,201 | 11/1976 | Falbel | 52/171 |

Primary Examiner—John E. Murtagh
Attorney, Agent, or Firm—Donald D. Jeffery

[57] ABSTRACT

An improved light-transmissive building element useful for walls, ceilings, roofs, windows, or the like consists of at least two light-transmitting flat sheets, such as panels, panes, and the like, which, together with a suitable frame, define a hollow space in which sound- and heat-insulating means are arranged. A number of transparent, static flat sheets, such as foils of plastic or elastically tensioned, flexible, thin plastic panels which may be coated with light-transmissive metal layers or the like are inserted in said hollow space at a small distance from each other.

11 Claims, 2 Drawing Figures

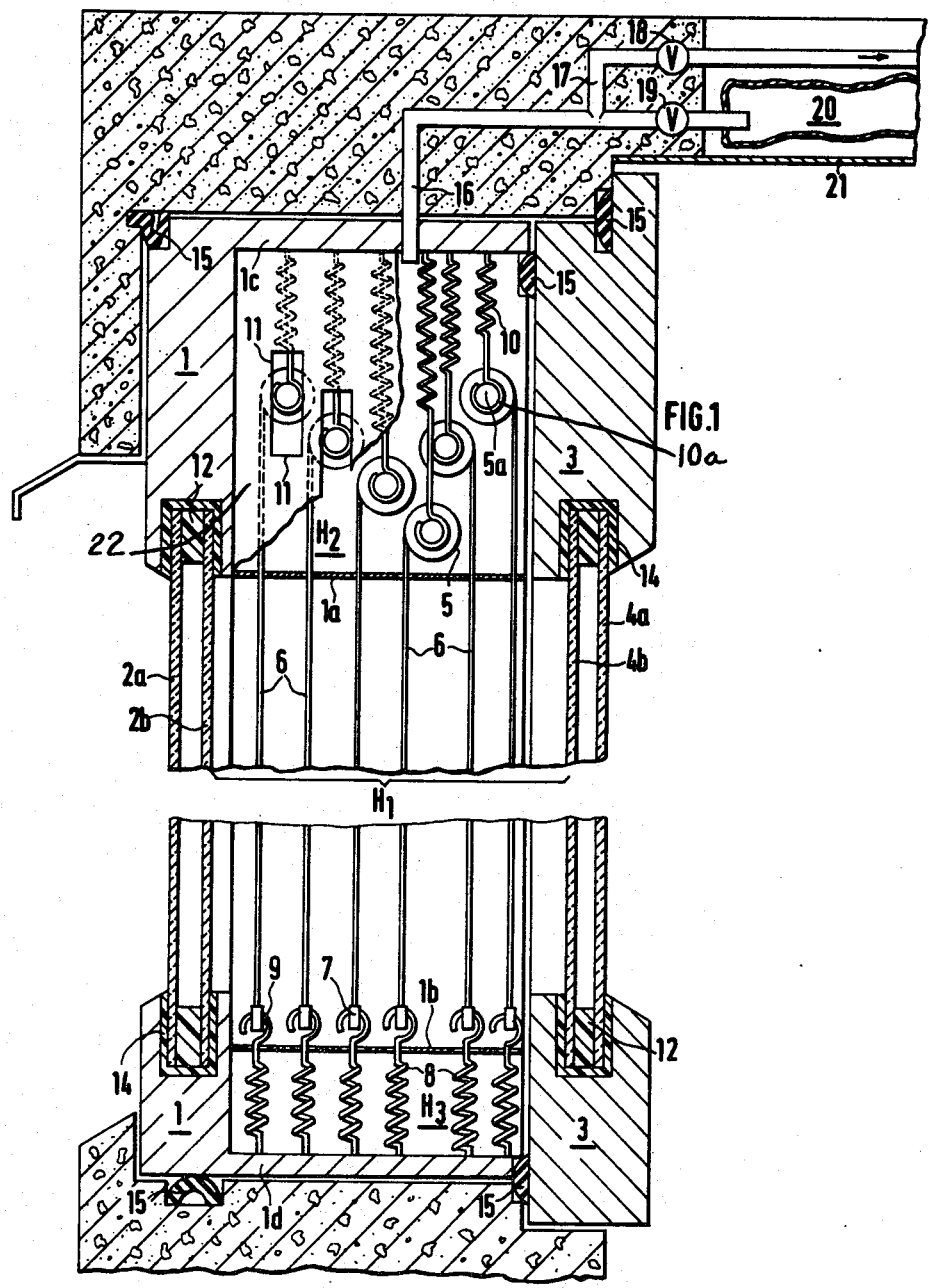

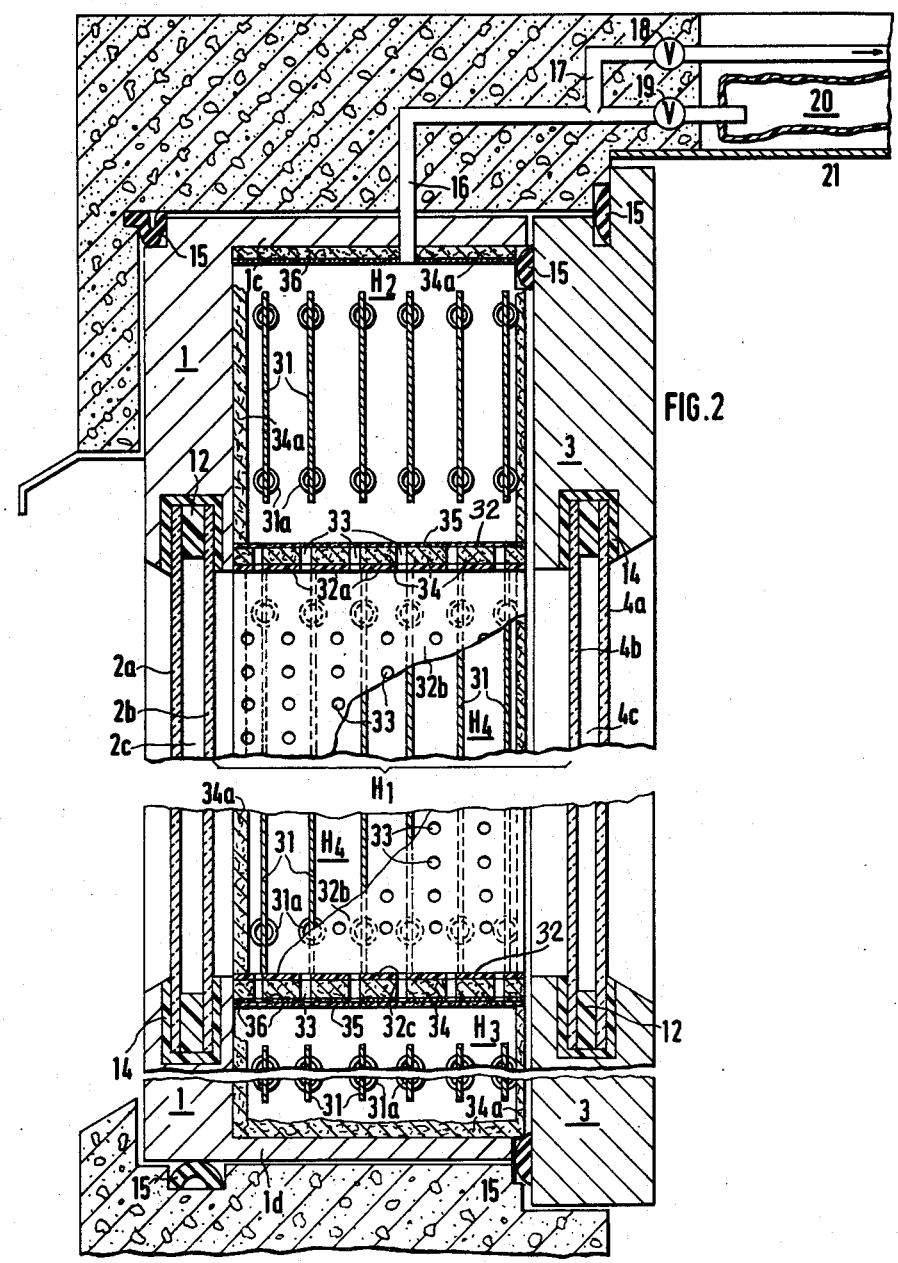

LIGHT-TRANSMISSIVE, SOUND AND HEAT INSULATING BUILDING ELEMENT

BACKGROUND OF THE INVENTION

(1) Field of the Invention

The present invention relates to a novel and improved structural unit and more particularly to a light-transmissive building element such as a light-transmissive wall element, ceiling element, or roof element, for instance, in the form of windows or the like. Said building element consists of at least two light-transmitting, i.e., transparent panes, panels, or the like which together with frame parts, seals, or the like, define a hollow space in which sound- and heat-insulating means are arranged.

(2) Description of the Prior Art

Despite all endeavors, light-transmissive openings provided with transparent panes, plates, or the like cause even at the present time high heat losses in winter and are also responsible for troublesome, disturbing, and excessive room temperatures in summer. In addition, the continuous noise of traffic on the streets of large cities which detrimentally affects the well-being of the inhabitants, cannot be excluded.

It is known that, partly for architectural reasons and partly for a desire to admit more light, the proportion of light-transmissive outer walls of buildings, auditoriums, and halls and, in part, also of ceiling elements, has increased greatly despite their disadvantages as compared with previous ways of constructing buildings. This development has been aided considerably by the light-weight construction method of building, for instance, skyscrapers. Problems of heat protection and acoustic insulation have been put definitely in the foreground on account of wall elements, particularly of those forming outer walls, which are mounted on building frameworks. In order to overcome thermal disadvantages, air-conditioning of the rooms and highly efficient cooling systems are required, particularly in warmer regions. This requires high expenses which, for instance, in the U.S.A., may at times amount to more than one quarter of the entire costs of the building. Cooling in summer requires about 10 times to 15 times the costs involved for heating a building in winter with respect to the same number of calories. The light-weight construction method naturally lacks the required mass for storing heat. On the other hand, the heat energy produced in the interior of a building in winter flows, due to thermal conduction, practically unimpeded outwardly in the form of infrared rays as a result of the walls transmitting light excessively and of the panes being cooled to the outside temperature. City noises penetrate to an even greater extent through the enlarged light-transmissive walls and windows into residential and business premises and thus complicate all activities.

The wide light-transmissive elements demand a great deal of those building elements which bear and support the front walls.

All this results in serious losses concerning the national economy. Accordingly, an urgent necessity exists to eliminate these thermal and acoustic imperfections by providing novel and particularly combined solutions without doing away with the advantages of the light-weight manner of construction.

In earlier applications directed to light-weight construction elements, solutions have been suggested which make it possible to impart a high amount of thermal and acoustic insulating properties to solid light-impervious structural elements.

SUMMARY OF THE INVENTION

It is one object of the present invention to provide light-transmissive building elements, and especially light-transmissive wall elements, ceiling elements, roof elements, or the like which are at the same time highly sound and heat insulating and which are especially suitable as elements in the light-weight construction of buildings.

Other objects of the present invention and advantageous features thereof will become apparent as the description proceeds.

In principle the objects of the present invention are achieved by improving the known light-weight construction elements so that they can be applied to produce light-transmissive building elements and thus will satisfy any requirement with respect to heat and sound insulation. The building elements according to the present invention may, for instance, be used in light-transmissive ceilings to introduce only diffuse light into a room inspite of the direct action of the sun-light or, in the case of vertical windows, to maintain, for instance, absolute clarity of vision, at least at a corresponding height of view, in addition to the desired insulation. Depending on the specific purpose, other possibilities of using the novel light-transmissive building elements will be described hereinafter.

According to the present invention, light-transmissive layers consisting in particular of transparent, elastic foils of plastic material or light-transmissive, elastically tensionable, flexible, thin plastic panels, preferably in tensioned condition in order to achieve predetermined varying inherent frequencies are optionally provided in at least one hollow space which is defined by light-transmissive panes, panels, or the like of a suitable light-transmissive material. Said layers are for instance, coated with known metal coatings, such as transparent gold coatings. These light-transmissive layers are arranged at will one after the other in the number required for the respective specific needs. They are separated from each other only at a small distance apart, for instance, at a distance of only about 4 mm.

The very thin transparent metal coating of such plastic foils prevents in summer, by reflection, the heat rays from entering inhabited rooms while in winter it prevents said heat rays, conversely, from passing out of the heated rooms.

In the air-tightly and vapor-tightly sealed hollow space, for instance, between elastically embedded panes, there is preferably provided under subatmospheric pressure a predried gas which is a poor conductor of heat. Agents which absorb water vapor can also be introduced and the hollow space can be connected with a dry-air circulating device as well as with an evacuating device. Since the foils are stretched elastically at a slight distance of a few millimeters from each other, for instance, by means of springs, the layer of air or gas present between said foils is quiescent. If transparent foam panels or the like are associated, in special cases, with the foils, convection is additionally prevented by said foam panels. For instance, sulfur hexafluoride which is a gas of poor heat conductivity can be introduced under vacuum. In this manner passage of sound is also reduced in accordance with the vacuum. Honeycomb plates, for instance, of transparent plastic material can also be arranged elastically tensioned so as to be able to vibrate with respect to the foils. The cell size of the transparent honeycombs should be as large as possible in order to reduce to a minimum the number of the sound and heat bridges produced by the point-wise intersecting of the web walls. If, for instance, the transparent plastic foam plates with closed pores which may be interposed between the foils are pressed by the subatmospheric pressure into the large web openings, the cell walls are to be made correspondingly higher so that an optimum free space remains to effect thermal and acoustic insulation. The transparent honeycomb plates may also bear a very fine metallic transparent coating. If metals are used which are subject to oxidation or since the transparent metal layer may be damaged, the surfaces of such coated foils, honeycomb plates, and the like are to be coated with a protective coating of polyethylene of a thickness of less than 0.1 mm.

If desired, the foils, panels, or the like and the honeycombs are to be provided with perforations. In order to achieve increased reflection of acoustic and thermal rays, transparent foils which are transparently coated with metals in a reflective manner may be interposed, if desired, in slightly wrinkled condition between the tensioned foils as well as in other hollow spaces. At the same time they prevent convection of the air or gas.

It is advantageous to provide the edge parts of the foils to be tensioned with linear reinforcements so as to be able, for instance, to fasten elastic spring means to these edge parts. These reinforced edge parts linearly transmit the pull of the springs, rubber bands, or other tensioning means uniformly over the foil surfaces. The tensioning means can instead be provided on reinforced corner parts of the foils, panels, or the like to be tensioned in about diagonal direction. In this case, for instance, further tensioning means need not be attached.

The reinforced edge parts are not rigidly connected to each other at their corners, so as to make possible linear development of vibrations; they consist, for instance, of individual tensioning strips which are separate from each other.

To achieve acoustic insulation, transparent clamping bodies, clamping strips, or the like can be placed on said tensioning strips which are able to vibrate either at individual places or over the entire length.

The foils can consist of partial surfaces of different properties which are coupled together or attached to each other by elastic means. To effect such attachment, springs, rubber bands, and the like can suitably be employed. As elastic tensioning means which are arranged in the surface direction of the planes of the foils, there are used, for instance, means in the form of leaf springs which engage into the reinforced, for instance, outwardly bulged edge portions of the foils, thus pressing the latter towards the outside. In this connection the leaf springs, stretched in outwardly bulging form, may bend without contacting the foils or panels. All the tensioning means can be arranged with adjustable tension, for instance, by means of tensioning screws.

Transparent tensioned panels, for instance, of plastic, glass fibers, or the like which are capable of diffusely refracting light, can also be arranged between the panes and foils within the hollow space. Heavy substances, for instance, small glass bodies, and particularly glass beads or other pourable, transparent, for instance, granular, crystalline material can be introduced in the cells of transparent, for instance, tensioned honeycomb plates so as to effect diffuse refraction of the heat rays as well as sound attenuation.

Such individual cell charges are to be effected, for reason of insulation, in an irregular manner and, in the case of successive honeycomb plates, staggered to each other in only part of the honeycombs.

Furthermore, in order to achieve increased sound absorption and attenuation, rigid-foam flakes can be introduced, for instance, into honeycombs that are preferably stretched in a gently elastic manner. Stressed honeycomb plates form resonators the oscillations of which are dampened by fillers which are foamed or introduced thereinto, for instance, rigid foams with closed pores, as a result of friction. Transparent, for instance, tensioned foils, panels, or the like of plastic material and, interposed between the latter, transparent, preferably tensioned foam panels can be arranged between every two transparent honeycomb plates.

By pressing transparent foam plates into the openings of the honeycomb, the latter are also tensioned. Thus, for instance, plates with closed pores which plates are enveloped by metallically coated transparent coated plastic foils, i.e., transparent honeycomb plates with reflectively coated surfaces can form elastically tensioned heat- and sound-insulating reflecting chambers. The panes defining the entire hollow space should also be completely embedded in an elastically vibrating manner in order to absorb acoustic oscillations.

The hollow space of the light-transmissive structural element can be limited by double panes, at least towards one side. The narrow space between the panes defined by the latter can be heated and vented with dry gases. These gases may be under negative pressure. The panes can be provided with a reflective, metallic, transparent coating.

The panes arranged towards the interior of the inhabited space are to be kept at a temperature that brings about approximately an equilibrium between the heat rays continuously radiated into the living space by the panes and the heat rays impinging on them from said living space. Insofar as screw connections are required, they should not be screwed through heat attenuating layers. The screw connections, made preferably elastically of insulating, transparent material, for instance, of plastic, and the screws should be embedded on all sides by means of resilient packings, which may also be provided with elastic washers so as to allow them to vibrate. Despite the large number of means which can be employed and their combinations, in principle there should always be provided, in order to achieve optimum insulating effects, an arrangement in which there are a minimum of heat and sound bridges, for instance, by means of elastic points, such as by means of transparent ribbed plates. If possible, all parts are to be arranged in elastically oscillating manner, if necessary, with the association of such sound absorbing means. The panes which define the hollow space towards the living space should have approximately the temperature of the living space and not the temperature of the outside air. This is made possible by providing a three-pane glass, or preferably four-pane glass, in particular in the form of two double panes with at least one insulating hollow space as described above. Said hollow space can be subdivided in an air- and vapor-tight manner, by using, for instance, glass panes made of plastic, such as acrylic glass. The panes towards the living space are preferably thermal panes.

Tensioned, transparent, for instance, reflective foils, membranes, and the like can also be arranged between the double panes, for instance, of composite panes, in order to achieve sound and heat insulation. Foils of polyethylene terephthalate of low light absorptive power can be used as transparent foils. Their heat insulating power is based on reflection by their transparent metal coating. Dry difluoro monochloro methane, which has a high heat attenuating value, can also be introduced as filling gas into the hollow space, preferably under vacuum.

The intermediate layers between honeycomb plates and tensioned foils and panels are to be kept under a softer spring action, the more they are intended to absorb low frequencies.

The sound absorbing and the infrared ray reflecting transparent panes, foils, panels, foam plates, honeycomb plates, and the like can be arranged, if desired, so that they reduce the visible light only to the desired extent.

Reference has been made hereinabove to a hollow space. This hollow space can be subdivided at its upper and lower parts as well as at its lateral parts by the aforementioned perforated cover plates. These subdivisions are uniformly in communication with each other. The perforated cover plates can be completely dispensed with, for instance, when the panes defining the hollow space are frosted glass panes.

All the means serving for arranging and actuating the insulating means, and said insulating means themselves, can be arranged exclusively in the concealed parts of the respective rooms. The sound vibrations penetrate through the optimally perforated cover plates and are absorbed therein by the insulating means. Said provisions of additional spaces formed by the cover plates is particularly advantageous when the light-transmissive building elements, for instance, light strips or windows, are to permit a clear view towards the outside.

Combinations of the arrangement of the foils can also be provided. If clear-view foils or clear-view panels without metal coating are stretched across the field of view, then there is practically no impairment in light transmittance. The devices and arrangements described hereinabove make it possible optionally to use the most favorable combinations in each specific instance and in accordance with specific requirements and depending on the region involved, namely whether tropical regions or northern regions are involved. For this purpose, the foils or panels can be actuated and can be moved into the field of light accordingly, for instance, by means of transparent plastic ropes, cords, or the like, over pulleys as well as by means of electric motors with corresponding switches and gears. If transparent panels or plates are used in place of flexible foils, their optional displacement into the field of light of the hollow space, for instance, by means of the aforementioned ropes from concealed adjoining spaces, such as lateral hollow spaces, preferably on slide means or supporting rollers, is required.

The variable construction of such light-transmissive structural elements in the manner described hereinabove is highly economic inspite of its diversified nature. This is true since it is possible to achieve the most favorable working conditions with respect to establishing the desired temperature conditions as well as with respect to noise elimination. Furthermore, considerable expenses for heating in winter and for cooling in summer are saved.

In addition it may be pointed out that acoustic vibrations in a frequency close to the inherent oscillation of the tensioned foils with large amplitude of oscillation are absorbed and thus, accordingly, energy is withdrawn from the sound field. By providing a number of foils which can vibrate with predetermined different frequencies and which are arranged one behind the other, it is possible to cover the entire frequency spectrum.

BRIEF DESCRIPTION OF THE DRAWINGS

The above described and other objects of the present invention will become apparent from the following detailed description of illustrative embodiments of the invention in conjunction with the following drawings in which FIG. 1 is a vertical cross-sectional view through the upper and lower parts of a double window, in which the insulating means are arranged in the upper part of its hollow space, can be moved optionally into the field of view, and are arranged on fastening means in the lower part of its hollow space;

FIG. 2 shows the same double window, but with insulating means arranged tensioned immovably above and below and to the side of the field of view of the hollow space.

DESCRIPTION OF THE PREFERRED EMBODIMENTS

FIG. 1 shows, in vertical cross-sectional view, the upper and lower parts of a double window. A double pane $2a$, $2b$ (thermoglass) is provided in outer frame 1. Inner frame 3, also being provided with a double pane $4a$, $4b$, is arranged at a correspondingly great distance from outer frame 1 in order to form hollow space $H_1$ serving for insulating purposes. The insulating hollow space $H_1$, $H_2$, $H_3$ thus formed is constructed in its entirety in an air- and vapor-tight manner, inter alia, by means of suitable seals 12, 15.

The upper and lower parts $H_2$ and $H_3$ of said insulating hollow space $H_1$, $H_2$, $H_3$ are separated by plates $1a$, $1b$ provided with slits. They serve to receive the insulating means and the means for their arrangement and actuation.

Thus FIG. 1 shows schematically in its upper part, tensioned spring rollers 5 arranged staggered with respect to each other. Transparent foils, particularly plastic clear-view foils 6, are arranged on said rollers so that they can be unrolled, at given distances from each other, downwardly against the roller tension and that they can be hooked in the lower part of the insulating hollow space $H_1$ by their edge strips 7, bearing corresponding holes, in spring hooks 9 provided in hollow space 1, by springs 8, which extend upwardly through perforations into the lower cover plate $1b$ from hollow space part $H_3$. If foils 6 are pulled downwardly from spring roller 5 and are hooked in said elastically resilient hooks 9, they have a predetermined tension with which they are capable of absorbing natural oscillations within a predetermined range of sonic frequencies. Thus, among others, even low-frequency sounds, i.e., so-called buzzing sounds which heretofore could be damped only by heavy brickwork of considerable thickness can be absorbed by relatively lightly tensioned foils 6 of a suitable thickness.

The downwardly pulled foils 6 can also be stretched or tensioned horizontally. This is achieved by providing the vertical members of window frame 1 in a corresponding manner in hollow space part $H_1$. For this purpose, elastically resilient means can be arranged laterally in the concealed vertical hollow space part (see FIG. 2, $H_4$).

These vertical window-frame members can be constructed so that the foils can be fastened with elastic resiliency at desired heights laterally by their strips 7 to tensioning and locking means provided concealed behind the frame members. For this purpose, spring rollers 5 may have such tensions that the tension of foils 6 changes only insignificantly, if at all, despite the difference in height to which they may optionally be pulled down. Furthermore, the foils can be subdivided into partial areas provided with different properties, which can be connected with each other with elastic resiliency. These partial surfaces may have different inherent frequencies. As a result thereof, the vibrations cancel out each other when wave crest coincides with wave trough due to suitable acoustic waves.

Successive sheets are adapted to each other in their tension and subdivision so that they can absorb a maximum of the spectral range to be covered. Transparent means, for instance, foam plates, which convert the vibrations into heat by friction between these resonators, can be provided.

Another function of these foils is to achieve thermal insulation.

For this purpose the glass-clear foils can be provided with very thin, but transparent metal coatings. These metal coatings reflect the long-wave heat rays of the invisible infrared range. Reflection can be increased, as desired, by a plurality of metallically coated foils, arranged one behind the other, by pulling as many reflective foils as required by the existing light conditions, downwardly from their spring rollers 5.

Transparent non-reflective foils having given inherent oscillations described hereinabove can be stretched in between, so that sound insulation is not reduced on account of providing only a small number of reflective foils 6 which have been pulled down.

The individual foils 6 are developed in such a manner that an uncoated viewing field may optionally remain, for instance, at eye level. Each individual foil can be developed differently in sections, in accordance with the desired combination with other foils having clear-view surfaces or reflective surfaces, and can be provided with different tension. Thus all requirements for thermal and acoustic insulation can be satisfied. If the outer panes 2a, 2b have in winter, due to the cold outside air, the same low temperature as said outside air, the air can be subdivided within the building unit into quiescent insulating layers by foils 6 stretched in the insulating hollow space. The inner panes 4a, 4b are then insulated in such a manner that they are of about the same temperature as the air in the living space. The feeling of well-being of a person is dependent on the equilibrium between the heat rays emitted from his body and the heat rays which impinge upon him. The panes 4a, 4b directed towards the inhabited room can be developed as thermal panes so as to reflect heat rays and thus can reflect the heat rays impinging thereupon from the inhabited room partially back thereinto.

In particular, a flat, glass-clear body, for instance, of plastic, with water contained therein, can be detachably arranged on the inner side 4b of the double pane 4a, 4b towards the insulating-cavity side. In this case, the one wall of said body can be formed, for instance, of a flexible glass-clear plastic foil. It can rest closely against the pane 4b. The other wall can be made, for instance, of a plastic sheet or of glass. Known adhesive agents or fastening means can be used for attaching said glass-clear body on frame 3 and/or pane 4b. The heat rays directed outwardly from the heated inhabited room in winter are retained by said layer of water and the water is heated. To improve the heating effect at least the wall of the water container which faces part $H_1$ of the hollow space can be provided additionally with a transparent metal coating and/or interposable reflective foils 6 having a correspondingly strongly metallic, transparent coating which may optionally be pulled down between panes 2b and 4b under permanent tension.

In this way, any desired blocking effect against the emergence of the heat rays from the interior to the outside can be achieved. By foils 6 having different properties which differ in type and number as well as in their tension and which can be interposed, as desired, over partial sections, and by the provision of an intermediate layer of water it is possible to achieve at any time of the day as well as at any season of the year and in every zone of climate, an optimum thermal and acoustic insulation both from the outside towards the inside and conversely from the inside towards the outside.

The spring rollers 5 can be suspended on tension springs 10 of different strength, which are fastened to the roof 1c of hollow space $H_2$. For this purpose, springs 10 engage by means of suitable wire loops 10a around shaft 5a of spring rollers 5 so that the latter are held fast under spring action by the loops. The shafts of the spring rollers 5 are arranged so that they can swing up and down in vertical slots 11 of two guide plates 22 arranged on the two sides.

Springs 8 with hooks 9 for the attachment of foils 6 which are pulled down in tensioned state at their lower edge parts 7, as well as the spring means adapted to be arranged on the vertical frame arms can be developed to receive lateral tensioning and locking means, for instance, hooks or the like, for foils 6 which can be pulled down under tension to the desired height.

As a further embodiment of the present invention there are provided rollers, for instance, with spring tension (not shown) as they are described with respect to the upper part in lower part $H_3$ of the hollow space below cover board 1b.

These rollers have rope pulleys or the like on which ropes are wound. It is possible to rewind by means of these ropes the tensioned foil which is of a suitably greater length than corresponds to the height of the light-pervious wall, optically to a greater or lesser extent from the upper spring roller onto the lower spring roller, which for this purpose may have an oppositely acting spring tension. If, for instance, the length of the foil is three times the height of the light-transmissive wall, then the first third of this foil can, for instance, be glass-clear and uncoated. The second third can be divided up into a plurality of partial surfaces of which, for instance, the middle surface has a glass-clear viewing field without coating while the partial surfaces located above and below same have a reflective coating. Adjoining said second third part of the foil, its last third can then be coated in a reflecting manner on its front in such a way that the thickness of the foil can be greater towards its upper and lower parts than in its central part, so as to increasingly reflect heat rays outside the field of view.

Such different construction of the entire foil can be combined in any desired manner with the preceding and following foils which may also be constructed differently as a whole and in partial sections.

Actuating the individual foils can take place in the living room via guide rollers, for instance, by means of ropes which are guided in an air- and vapor-tight manner or by means of electric motors and controllable transmissions.

The double panes $2a$, $2b$, and $4a$, $4b$ are arranged at their inner edge parts elastically with respect to each other by means of an air- and vapor-tight seal member 12 which is coextensive with the panes and the panes are embedded in a manner permitting vibration in an outer U-shaped, highly elastic profile 14, which surrounds the edge parts and at the same time seals the double panes.

Dry gases which are poor conductors of heat, for instance, sulfur hexafluoride, may be introduced between the double panes $2a$, $2b$ and $4a$, $4b$, preferably under a vacuum, or else other light-transmissive means which serve for insulation can be arranged thereinbetween. The frames 1 and 3 are also embedded in vibratable manner elastically and at the same time in an air- and vapor-tight fashion, for instance, via seals 15, and they surround the hollow space $H_1$, $H_2$, $H_3$ in the same manner.

The hollow spaces $H_1$, $H_2$, $H_3$ can also be filled with a dry gas, and particularly with a gas which is a poor conductor of heat, preferably under a vacuum. For this purpose pipes 16, 17 with valve 18 are provided. Said pipes lead to a filtering as well as drying and evacuating device.

If, on the other hand, the pressure in the hollow spaces $H_1$, $H_2$, $H_3$ is to be approximately the same as the atmospheric pressure, pipe 16 can then be connected via valve 19 with an air- and vapor-tight bag 20 which absorbs the increase in gas volume occurring upon heating. This bag can be provided, for instance, in a false ceiling 21. The air or the gas in hollow space $H_1$, $H_2$, $H_3$ can also be circulated through upper and lower closure ducts by a circulating pump, for instance, over an electric heating device and thus can be heated to a predetermined temperature which it imparts to the hollow space. The same can be provided also for the spaces between the double panes $2a$, $2b$ and $4a$, $4b$ by means of air inlet and outlet pipes as well as valves. For this purpose, filtering, drying, and evacuating devices with valves can also be arranged in between in order to produce a vacuum.

For sound insulation, the vibrations are absorbed by vibratable means, for instance, by foils 6 which are tensioned with different inherent frequencies. It is advantageous to provide additional means for the transformation of the vibrations into molecular thermal movement. For this purpose there are suitably arranged, for instance, transparent, plastic foams which are as transparent as possible and which preferably have closed pores, in tensioned condition between the foils. Glass-clear wrinkled foils provided, for instance, with reflective light-transmissive, fine metal coatings may also be interposed.

Another possibility resides in the aforementioned subdivision of the tensioned foils into partial surfaces which are elastically coupled to each other and the differences in frequency of which foils are such that as a result of the coupling wave crest and wave trough are superimposed and cancel out the vibration.

Another possibility consists in providing the edge parts with strips which are separate from each other at the corners and with means which are clamped on said strips, similar to placing a mute on the bridge of a string instrument in order to deaden or soften its sound vibrations.

If a vacuum or negative pressure is to be produced, for instance, between the double panes, transparent, preferably tensioned, honeycomb plates having large cell diameters can serve, for instance, as supporting means.

In principle, not only foils but also transparent panels, boards, panes and the like, for instance, provided with profilings can be arranged in an elastically swingable manner, for instance, by tensioning so as to obtain predetermined natural or inherent frequencies, preferably in combination with other flexible tensioned means.

Within the insulating hollow space $H_1$ there can be provided, behind and alongside each other, flat box-shaped hollow bodies which are closed off in vapor-tight manner on all sides and which are preferably glass-clear. In said hollow bodies there are contained transparent insulating means under particularly advantageous insulating conditions, for instance, under a negative pressure or vacuum. By any desired arrangement of such different insulating bodies in optimum sequence and by enabling replacement thereof all insulating requirements can be satisfied in accordance with the season of the year and the climatic zones.

A working example of such a box-like hollow body to be introduced consists in providing between the two transparent box surfaces one or more glass-clear ribbed plates with statically sufficient ribs which are as far apart as possible, for instance, with vertical and horizontal intersecting ribs. In such an arrangement the linear contact lines of the ribs with the outer surfaces of the box can also be reduced to pointwise contact by means of small insulating, transparent, approximately trapezoidal plastic bodies. Said bodies are displaceably placed, for instance, on the ribs and thus at any desired statically predetermined distance from each other. These small insulating bodies make possible, instead of the linear contact of the ribs, a merely pointwise contact and provide the necessary support against the outer pressure in case of a negative pressure or vacuum within the hollow body.

In another embodiment concerning said replaceable, flat, boxlike hollow bodies, glass-clear honeycomb plates are, for instance, arranged in single or multiple sequence, and in the latter case with flat glass-clear intermediate layers, within the hollow body, and the latter is evacuated or completely filled with water.

As a matter of precaution the water which expands by heat, even though only slightly, can be taken up, for instance, at an edge portion by a small, flexible, concealed plastic hollow body. The box-shaped hollow bodies are dimensioned so that no air gaps remain in the double window.

Preferably said box-shaped hollow bodies are sealed on all sides in an air- and vapor-tight manner with respect to the preceding and following elements which are introduced into hollow space $H_1$.

Furthermore, the box-shaped hollow bodies can be heated, for instance, by means of electrical resistances or by means of hot air. For this purpose, as well as for evacuation (for instance, for producing negative pressure) suitable connections, such as to an air conditioning system, can be provided.

The double panes 2a, 2b and 4a, 4b can be heated in winter and cooled in summer by air which can enter and depart, for instance, via small tubes which are guided through the elastic edge inserts 12.

The double pane 4a, 4b can also be traversed by or filled with water for temperature control, and can be heated, for instance, by rheostat or cooled via an air-conditioning system.

Furthermore it may be pointed out with respect to the flat box-shaped hollow bodies with honeycomb inserts that transparent foam slabs with closed pores which are wrapped on all sides in glass-clear plastic foils which, if necessary, may bear a metallic reflecting layer, can, for instance, be provided on both sides of a honeycomb and can be pressed with tension into the honeycombs.

The foam slabs with closed pores can be mixed at the time of their manufacture to a predetermined extent, for instance, with finely comminuted high-gloss aluminum powder or very finely divided aluminum foil before or during foaming so that they effect a corresponding degree of reflection in the depth of the layer. Furthermore, in order to facilitate absorption of the sound vibrations, optimum perforations can be provided in partial depth, at least from the side the sound is acting on, into the slabs with closed pores.

FIG. 2 shows a window as a structural element, and parts identical to the window of FIG. 1 have the same reference numbers. The essential difference over the window of FIG. 1, however, resides in the arrangement preferably concealed outside the region of the panes or of the incidence of light, of vibratable membranes 31 which, with different tension and predetermined frequencies serve to absorb in particular those acoustic vibrations which are especially to be taken into consideration with respect to the specific sound range (for instance, at airports) within which the structural element is located. Since the membranes are capable of absorbing not only the same acoustic vibrations as correspond to their frequency but also acoustic vibrations which are in a multiple relationship to the half wave length of their fundamental frequency, it is advantageous to provide the membranes with the corresponding lowermost frequencies.

The membranes are arranged within the hollow spaces $H_2$, $H_3$, $H_4$ which are provided for this purpose circumferentially above, laterally of, and below the region of the panes or the ligh-incidence. The view of the membranes 31 contained therein is concealed by covering means 32. These covering means are preferably made in board shape in composite design from sound insulating material and are developed or arranged, for instance, so as to be under tension. Thus they can be fastened, for instance, by tensioning means inserted thereinto or with their edges clamped to window parts. In order to make it possible for the acoustic vibrations to penetrate into the concealed surrounding hollow spaces $H_2$, $H_3$, $H_4$ up to the membranes 31, the cover plates 32a, 32b, 32c are optimally provided with perforations 33. The latter can be designed so as to widen conically towards the outside in order to absorb as much noise as possible while, on the other hand, re-emergence of the sound from the concealed hollow spaces is rendered difficult. The bottom side of said cover plates 32 is covered with sound insulating, for instance, porous materials 34, which of course, leave free the perforations 33, and with a, for instance, sufficiently large-mesh sound pervious dust-filter cloth 35.

Said cover plates 32 take up, partially by absorption and partially by reflection, the acoustic vibrations which are reflected on the tensioned membranes 31. Furthermore, they can be arranged in tensioned form so as to vibrate and can absorb given frequencies. All walls, floors, and ceilings of these concealed surrounding hollow spaces $H_2$, $H_3$, $H_4$ can be equipped all around in the same manner. Insofar as heat insulation is to be achieved at the same time, metallized plastic fabrics, for instance, or optimally perforated plastic layers 36 can be provided for these layers.

The membranes 31 are tensioned preferably parallel to the pane surfaces and are positioned one behind the other. This tensioning can be effected in any desired manner, for instance, by springs 31a, rubber cords, for instance, with regulating tensioning screws or correspondingly arranged weights, preferably acting on all sides on the membranes 31. For this purpose, for instance, their edge parts are suitably folded over individually or are otherwise individually reinforced in some way in a manner capable of vibrating so as to prevent injuries to the membrane 31. The membranes 31 may be made of any suitable material and particularly of elastically tensionable material, for instance, of elastic plastic foils, of metal foils, of suitable elastic metal alloys, or organic material (for instance, skins), or of substances combined in accordance with the predetermined frequency. Elastic composite materials can be used especially for low frequencies. The membranes may also be capable of absorbing acoustic vibrations in themselves, for instance, by means of bipartite, stressed, spring-tensioned strips which engage, for instance, transversely and longitudinally to their surfaces, in inwardly folded edge folds.

Instead of arranging the membranes parallel to the building shells or panes, they may be provided, insofar as suitable, in other directions or they may extend, for instance, conically, so that the incident sound rays impinge with a given angle of incidence and, insofar as they are not absorbed, are reflected with a corresponding angle of emergence. As membranes there may be taken into consideration elastic bands corresponding to each of the shapes $H_2$, $H_3$, $H_4$. The membranes 31 can be subdivided in longitudinal and/or transverse direction, in which connection each partial section may absorb a predetermined frequency and the partial sections may be coupled together. Comprehensive insulation against the entire sound range can be achieved by different construction of the bands, for instance, on partial sections, and particularly by different band thicknesses, lengths, and widths of the bands, as well as by frequency combinations by coupling.

There can be provided perforations in the membranes in order to enable those sound vibrations which are reflected since they are not in agreement with the corresponding frequency of the membrane in question, to penetrate to the resonance membranes corresponding to them so as to be absorbed by them. If the springs 31a were arranged directly on the stationary parts of the building element, then a part of the vibrating energy would be transmitted to them. In order to prevent this, the tensioning means are arranged predominantly on elastic composite plates consisting, for instance, of two plates capable of vibration of plastic or sheet metal, between which there is glued or clamped (not shown) as a core, a highly elastic layer, for instance, of rubber in sandwich form. The one cover plate is connected with the tensioning means 31a of membranes 31 and the other cover plate with the parts adjoining it of the structural element or window, for instance, by glueing. If these covered hollow spaces $H_2$, $H_3$, $H_4$, at the same time, have to perform supporting or load-bearing functions, the cover plates can, for instance, be corrugated and the corrugations developed as flexurally resistant or load-bearing wall parts in intersecting position on both sides of the intermediate layer which is shaped correspondingly or fitted by glueing or pressing in between with inherent stresses. For this purpose, tensioning screws extending transversely from cover plate to cover plate through the elastic core and consisting, for instance, of plastic material, with elastic washers on the outer sides, may also be provided.

The membranes can serve simultaneously for heat insulation by reflection of the heat rays by providing said membranes with reflective metallic surface coatings or by constructing them as reflective metal foils as well as in composite construction design, for instance, with other nonmetallic interposed materials or foils. Tensioned metal foils are of increased heat insulating capacity, because their coherence forces are aligned by tensioning into the plane of tension. In this way, there is achieved at the same time compacting of the molecules at the surfaces of the metal foils. The vibrating molecules are forced predominantly to carry out their vibrating movements in the plane of tension with increased speed over a shortened path. The speed of movement of the molecules increases with the square of the proportional increase in tension. Accordingly, it is not possible for the vibrating metal molecules to absorb the energy of the long-wave infrared vibrations in relation to their short and high-frequency vibrations. Accordingly, reflection takes place to an increased extent. In this way penetration of thermal energy through the tensioned metal foils is substantially prevented. Practically complete thermal insulation is achieved by multiple staggering of the membranes one behind the other.

In order to improve thermal insulation, the parts surrounding insulating spaces $H_2$, $H_3$, $H_4$ can be coated on all sides with reflective surfaces, consisting preferably of metal, as can also all the insulating means introduced. If a negative pressure prevails in the hollow spaces $H_1$, $H_2$, $H_3$, $H_4$, then diffusion of the acoustic oscillations is correspondingly reduced. Of course, the hollow space $H_1$ of the double window between the two double panes 2 and 4 and at the same time the covered additional spaces $H_2$, $H_3$, $H_4$ connected therewith can also be air-conditioned.

Since, as already mentioned hereinabove, the comfort of persons within the living rooms is less dependent on the temperature of the air than on the extent of the infrared rays radiated from the walls onto the human body, it is necessary to suitably regulate the temperature of the inner panes and walls. For this purpose, the double panes 4a, 4b positioned on the side of the inhabited space can be coated, as also already mentioned, for instance, with a very fine, transparent gold coating which prevents entrance and emergence of heat rays. Furthermore, in particular, the air-tight hollow space 4c between panes 4a, 4b (as well as 2c) can be traversed by an adjustable, filtered, dust-free stream of air of predetermined adjustable temperature through opening 4, whereby pane 4a is maintained uniformly at the predetermined temperature and thus effects the desired optimum infrared radiation into the inhabited room. For this purpose, the necessary air-conditioning apparatus and corresponding pipe connections are to be provided.

For circulation, there can also be provided a temperature-adjusted liquid, for instance, water rather than a gas. The solid non-light-transmitting room walls and ceilings can be constructed approximately in the same manner. Between the load-bearing wall parts and the inhabited room, there can be provided, with the formation of a narrow air-tight gap with, for instance, spacer means of insulating material cemented therebetween at individual points, an inner wall consisting, for instance, of wood, plastic, sheet metal, or other suitable material, which is sound-dampened by elastic means provided, for instance, towards said gap.

Towards the side of the inhabited room, the solid wall can be covered decoratively in a conventional manner, for instance, by attaching wallpaper thereto. The surfaces facing each other in the gap are highly reflective due, for instance, to tensioned metal foils or metallically coated plastics so as to prevent passage of infrared rays and of sound in both directions. These foils can be in particular flexible coverings closed within themselves on all sides in an air- and vapor-tight manner, with inlets and outlets for the circulating air-conditioned air (or liquid).

For ceiling insulation and air conditioning thereof one can proceed in about the same manner.

Passage of moisture is also inhibited by the metal coating of the wall surfaces of the hollow space and of other parts.

I claim:
1. A light-transmissive building element comprising
   (a) frame means,
   (b) window panes mounted in transversely spaced relation on said frame means, said panes defining a hollow space therebetween,
   (c) means for sealing said panes in said mounting in said frame,
   (d) a plurality of light-transmissive sheets mounted in spaced relation from each other and between said panes in said hollow space, and
   (e) means for independently and variably elastically tensioning each of said sheets, whereby each of said sheets will vibrate and thus oscillate at a predetermined range of resonant frequencies in response to acoustic energy at said resonant frequency, said resonant frequencies for each of said sheets thus being variable and dependent on the tension applied independently to said sheets, wherein each of said independent elastic tensioning means comprises spring tensioned roller means around which at least one end of each sheet is wound, and resilient tensioning means operatively connecting said roller means and said sheet, with predetermined tension, to said frame means.

2. The building element of claim 1 wherein said sheets are in the form of clear plastic foils.

3. The building element of claim 1 wherein said window panes each comprise a pair of glass panes spaced from each other and mounted in seals carried by said frame means, the spacing of said panes providing increased sound and insulating capabilities to said building element.

4. The building element of claim 1 further including a rigid exterior shell enclosing said building element, and said frame means includes a first frame section mounted in sealed relation in said shell, the exterior most window pane being mounted in said first section, and a second frame section mounted in sealed relation in said shell, said second frame section carrying the window pane interiorally positioned in the building element, said first and second frame sections being sealed relative to each other thereby to provide a sealed hollow space defined by said frame sections and said panes.

5. The building element of claim 1 further including means communicating with said hollow space for conditioning the air therein.

6. The building element of claim 5 wherein said means for conditioning the air in said hollow space comprises pipe means and valve means by means of which said hollow space can be filled with a dry gas or a vacuum produced in said hollow space.

7. The building element of claim 5 wherein said means for conditioning the air in said hollow space comprises pipe means and a valve positioned in said pipe means, said pipe means communicating with an air and vapor-tight bag whereby the volume of gas in said hollow space can be maintained substantially constant despite increases and decreases of temperature in said hollow space.

8. The building element of claim 1 wherein each of said elastic tensioning means further comprises spring means operatively engaging the opposite end of each sheet for resiliently tensioning such end, the degree of unwinding of each of said sheets from said tensioned spring roller and the force of said spring means determining the tension applied to and the resonant frequency of said sheets.

9. The building element of claim 1 further including guide plates extending vertically in said building element generally perpendicular to said window panes and said sheets, said plates being provided with vertical slots, and said tensioned spring roller being provided with a shaft positioned in said slot thereby to accommodate vertical movement of said spring roller relative to said plates and to said frame means.

10. The building element of claim 8 further including upper and lower cover plates extending transversely in said building element above and below the normal viewing area through said window panes, said upper cover plate being formed with openings for receiving said sheets, and the bottom cover plate being formed with openings for receiving said spring means operatively connected to the lower ends of said sheets.

11. The building element of claim 1 wherein at least certain of said sheets are at least partially coated with a reflecting material thereby to reflect radiant energy and consequently increase the insulating characteristic of the building element.

* * * * *